Patented June 22, 1943

2,322,484

UNITED STATES PATENT OFFICE 2,322,484

METHOD FOR REMOVING MUD SHEATHS

Robert W. Stuart, Tulsa, Okla., assignor to Stanolind Oil and Gas Company, Tulsa, Okla., a corporation of Delaware No Drawing. Application September 20, 1940, Serial No. 357,613

5 Claims. (Cl. 252—8.55)

This invention relates to methods for removing mud sheaths from oil and gas wells, particularly the former, and it relates more especially to the completion of such wells by the removal of mud sheaths from the face of the producing formation and/or from the screen through which the well fluids are produced.

In drilling wells for oil and gas, it is customary to circulate a fluid through the well and around the bit during the drilling operation. Usually the drilling mud is an aqueous suspension or "mud" containing colloidal and inert material such as bentonite, clay, barium sulfate, etc. This drilling mud serves to lubricate the bit, to carry out cuttings and to consolidate the formation.

Two important functions of the drilling mud are to deposit an impermeable mud sheath on the face of the hole, thus reducing fluid loss into the formations adjoining the well, and to maintain a high hydrostatic pressure, thus preventing the escape of gas or oil into the well prior to completion of drilling operations.

Drilling muds, when properly prepared, serve their purpose well prior to the time the screen is set and the well is ready to be produced. However, after the producing formation is drilled and the well screen is in place, it is necessary to reduce the hydrostatic pressure in the well below the pressure of the formation and at the same time wash the mud sheath from the face of the producing zone, before the desired flow of gas and/or oil is obtained through the well screen.

The conventional procedure of completing an oil or gas well is to replace the denser drilling mud with water in the well, after the screen is set, thus reducing the hydrostatic pressure below the formation pressure and at the same time washing off the mud sheath from the sand face. In most cases after a short washing period, the well begins to flow and gradually cleans itself, until uncontaminated oil is produced. Although water is the cheapest and most convenient fluid that can be used to wash in a gas or oil well, there are several objections to its use which have been observed by me both in the field and in the laboratory. Water is a particularly poor fluid for cleaning the face of a permeable producing zone because in washing the sand face, it will channel through the mud instead of displacing it, with the result that the well walls and strainer or well screen face are not properly cleaned. This residual mud blocks off part of the face of the sand or other producing formation, thus causing channeling of the oil and often partially or completely plugging the well screen.

Furthermore, water is undesirable as a wash fluid because when an oil or gas zone is impregnated with water, the degree to which the formation subsequently permits flow of oil or gas is materially reduced. In other words, a fluid lock occurs so that the free flow of gas or oil is retarded and the rate of production from the well is seriously impaired.

Various wetting agents, surface tension reducers, interfacial tension reducers and the like have been proposed for incorporation in the wash fluid but I have found these to be generally unsatisfactory. While in some instances they do effect the ready removal of the mud sheath they markedly reduce the permeability of the producing formation and this is especially true in the case of oil sands as will hereinafter appear.

It is an object of my invention to provide a method for removing mud sheaths which will accomplish the more complete and more ready removal of such sheaths. It is also a very important object of my invention to provide a method of the type described which will not result in plugging the producing formation or markedly reduce its permeability to the well fluids. Another object of my invention is to provide a method of the type described which will remove the mud by disintegration rather than by causing it to come off in cakes with consequent plugging of the well screen and other disadvantages previously encountered. Other and more detailed objects, advantages and uses of my invention will become apparent as the description thereof proceeds.

In brief my method comprises essentially the step of circulating down through the well and behind the screen, in lieu of water, a concentrated non-saponaceous detergent chemical wash fluid which effectively removes the drilling mud sheath from the face of the sand or other producing stratum and which does not deleteriously affect the oil or gas producing capacity of the stratum.

By the use of such chemical wash fluids in accordance with my invention, a mud sheath on the face of the sand or other producing formation is thoroughly disintegrated so that it can be washed out of the hole very rapidly. Moreover, any of the wash fluid which may enter the oil-bearing formation during the washing process can be displaced readily by the subsequent flow of gas or crude oil from the formation and there is substantially no reduction of the permeability of the formation to oil. In fact in some cases there is an increase in this permeability.

In the past, as previously indicated, soaps, wetting agents, surface tension reducers and interfacial tension reducers have been proposed for the removal of mud sheaths. However, experimental work which I have conducted has shown that water containing such materials is less advantageous than fresh or salt water alone.

Another material used for completing wells and for removing mud sheaths is the so-called "mud acid" which is understood to be a solution of hydrochloric acid containing a small amount of a soluble fluoride. However, mud acid has the serious disadvantage that the mud is removed in cakes rather than disintegrated and these cakes tend to plug the screen and to cause other serious difficulties. Various other materials in dilute solutions have proven of little value, no value or negative value.

In sharp contrast with the results obtained by the prior art, I have found that relatively very concentrated solutions of certain water-soluble, non-saponaceous, detergent salts are markedly advantageous for the removal of mud sheaths. This fact has been shown both by laboratory work and by field tests.

Thus, for instance, I have tested a variety of wash fluids in the laboratory in tubes packed with sand grains of the type met with in producing formations. The laboratory experiments were conducted by determining the permeability of the sand to oil, then washing the sand with a wash fluid and then again measuring the permeability as the oil flowed through the washed sand. Solutions of typical surface tension reducers and interfacial tension reducers in concentrations recommended by their manufacturers caused a decrease of the permeability after washing to a value typically about 50 or 55% less than prior to the washing operation. When using fresh water, which is the usual wash fluid, the permeability after the washing operation was found to be about 45% less than previously. On the other hand, when relatively concentrated solutions of various phosphates were used the permeability after the washing step was found to be much higher than when the sand had been washed with water. For instance, when the sand was washed with a 20% solution of disodium pyrophosphate ($Na_2H_2P_2O_7$) the permeability was found to be substantially the same as prior to the washing operation. When a 20% solution of disodium phosphate ($Na_2HPO_4$) was used the permeability was decreased somewhat by the washing operation but the decrease was only about one-half that resulting from the use of pure water. A 10% solution of tetrasodium pyrophosphate ($Na_4P_2O_7$) gave results nearly as good as those obtained by the use of 20% disodium phosphate ($Na_2HPO_4$).

These laboratory results have been confirmed by the use of concentrated phosphate solutions in the field. Thus it has been found, for instance, that where a 7000 foot well was washed with water and swabbed to 5000 feet without flowing, a wash with a 20% solution of disodium pyrophosphate ($Na_2H_2P_2O_7$) caused the well to begin to flow promptly.

The mud sheath can be subjected to the action of my improved well washing fluids in various ways which will readily occur to those skilled in the art. In general it can be applied in any of the ways heretofore used with water and other known wash fluids. For example, it can be circulated down through the well behind the screen and thence up through the annular space between the tubing and the casing, or it can be inserted in the well and the well can be swabbed, or in some instances it can be pumped into the well and will cause sufficient flow from the producing formation so that the wash fluid and the disintegrated mud will both be carried to the surface. In any event, by circulation or otherwise the disintegrated mud is, of course, removed.

I have found that these wash fluids are not only effective to remove mud sheaths within the well but in some instances serve to remove mud which has penetrated into the formation itself. Thus in one case where the mud had been forced into the producing sand, a concentrated acid phosphate solution was likewise forced into the sand under pressure and came out greatly contaminated with oil-cut mud. This is an indication that the chemical removed at least a large part of the mud from the sand body.

In addition to the particular phosphates which have been named other phosphates and various non-phosphate materials can be used. The salts which I prefer to employ are those having a specific cleaning action towards siliceous materials. In other words, they are detergents. The wash solution must have a pH sufficiently low so as not to emulsify with the oil or to precipitate calcium, magnesium or iron in the producing formation. In general it is very preferable to have the pH value of the wash fluids below about seven. When a phosphate or other salt having a basic reaction is used, the solution can be acidulated with phosphoric, hydrochloric or other acid in order to prevent emulsion difficulties. The use of an acid solution also has the advantage of removing any lime present in the producing zone.

The specific phosphates previously mentioned are, of course, only exemplary of many phosphates which can be used. Thus, for instance, instead of disodium pyrophosphate ($Na_2H_2P_2O_7$) the corresponding acid salts containing either one sodium atom and three hydrogen atoms or three sodium atoms and one hydrogen atom can be used. Likewise in place of disodium phosphate ($Na_2HPO_4$) the monosodium ortho compound can be employed as can the trisodium ortho compound although the latter is not preferred. Sodium hexametaphosphate $$(Na_6(PO_3)_6)$$

is also valuable as a mud sheath remover although it is preferable that this compound be used in an acidulated solution, having a pH below about seven, this also being true of tetrasodium pyrophosphate ($Na_4P_2O_7$) and other phosphates giving a basic reaction.

Concentrated solutions of other non-saponaceous detergent salts can likewise be employed, notably sodium bicarbonate, sodium bisulfite, sodium acetate and sodium silicate. These non-saponaceous salts are greatly preferable to soaps since the latter produce emulsification and plugging in the formation. The detergent salts have been found to give much better results than non-detergent salts, such, for instance, as the alkali metal perborates.

In the preceding examples of non-saponaceous detergent salts to be used in accordance with my invention, I have referred exclusively to the sodium salts. It will be understood, of course, that potassium salts or salts of any other alkali metal can be used equally well and that the ammonium radical is a full equivalent of the alkali metals. However, the sodium salts will in general be found to be the most convenient.

Moreover, while I have mentioned the use of such salts as sodium acetate and sodium silicate as well as phosphates other than the acid phosphates, I find it generally preferable to utilize the acid salts, particularly those of phosphoric, carbonic and sulfurous acids. In other words, I prefer to use a detergent salt in which an inorganic oxygen-containing acid radical is combined with at least one atom of an alkali metal, or its equivalent, and at least one atom of hydrogen.

One important feature of my invention is the use of any of the detergent chemicals previously described in relatively very concentrated solutions. Concentrations of at least 3% and preferably at least 5% should be used. In fact in commercial work I prefer to use concentrations up to about 10 or 12%. Still higher concentrations can be used, up to 20% or even up to the maximum solubility of the particular material chosen.

In referring to mud sheaths I have made particular mention of the mud sheath on the face of a producing formation and it is in the removal of this mud sheath that my invention finds its most important application. However, as previously mentioned, the invention likewise applies to the removal of mud sheaths from well screens, by which term I mean to include well strainers, and the invention can also be applied in much the same way to the removal of other mud sheaths present within a well, for instance to the removal of a mud sheath present at a level at which it is desired to cement. The removal of this latter type of mud sheath serves to improve the cementing job.

While I have described my invention in connection with certain specific embodiments thereof, it will be understood that these are by way of illustration and not by way of limitation and that I do not mean to be restricted thereto but only to the scope of the appended claims.

I claim:

1. A method of completing an oil or gas well comprising washing said well with a concentrated aqueous solution of a phosphate, said solution containing at least 3% of said phosphate, to disintegrate a mud sheath present in said well.

2. A method of completing an oil or gas well comprising washing said well with a concentrated aqueous solution of an acid phosphate, said solution containing from about 5% to about 20% of said phosphate, to disintegrate a mud sheath present in said well.

3. A method of completing an oil or gas well comprising washing said well with a concentrated aqueous solution containing at least 3% of a disodium pyrophosphate to disintegrate a mud sheath present in said well.

4. A method of completing an oil or gas well comprising washing said well with a concentrated aqueous solution containing at least 3% of disodium phosphate to disintegrate a mud sheath present in said well.

5. A method of completing an oil or gas well comprising washing said well with a concentrated aqueous solution of a phosphate, said solution containing at least 3% of said phosphate and having a pH below about seven, to disintegrate a mud sheath present in said well.

ROBERT W. STUART.